April 29, 1930. E. W. SCHELLENTRAGER 1,756,703
BATTERY BOX
Filed March 8, 1927
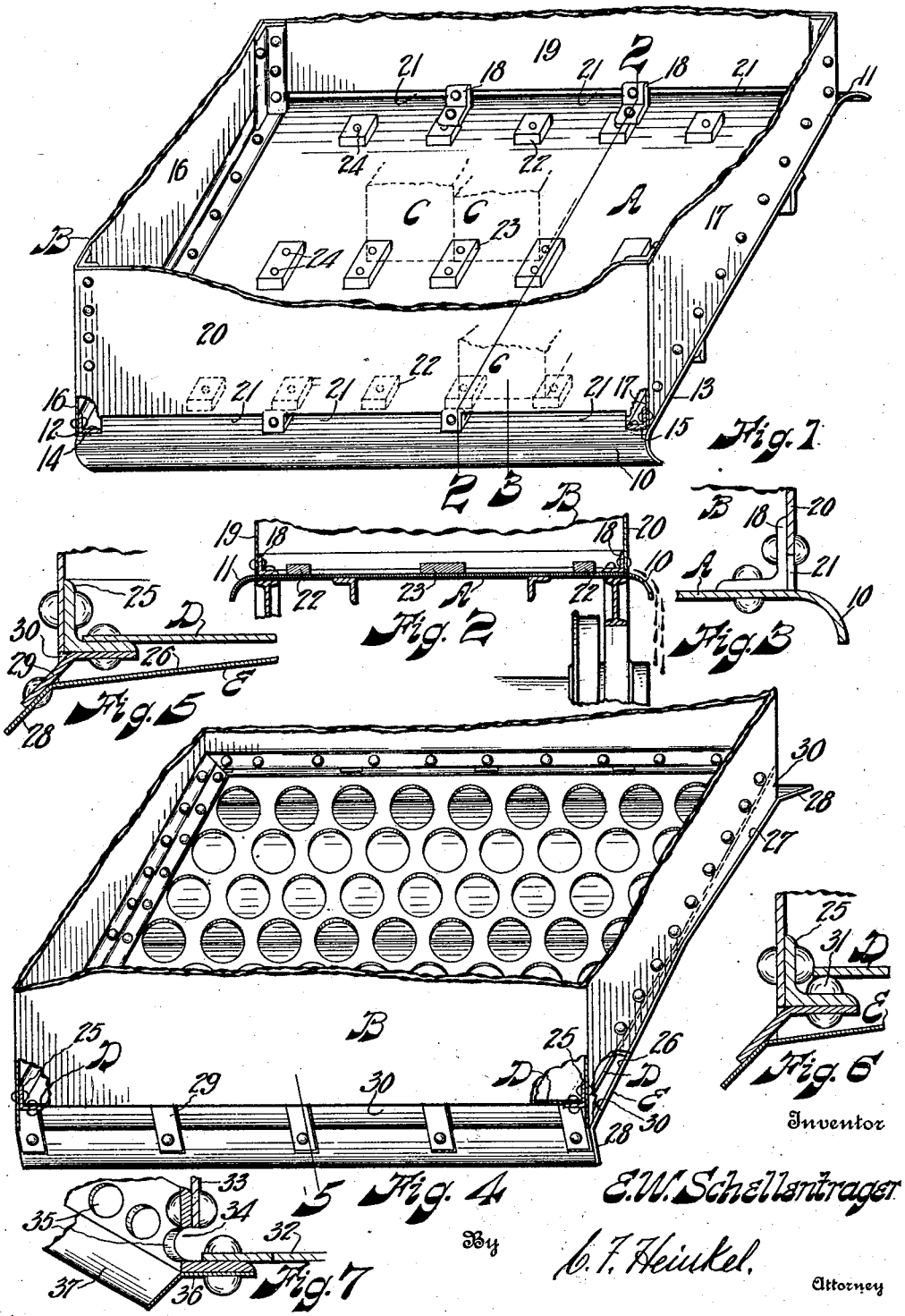
Inventor
E. W. Schellentrager
By C. F. Heinkel,
Attorney Patented Apr. 29, 1930

1,756,703

UNITED STATES PATENT OFFICE

EUGENE W. SCHELLENTRAGER, OF SHAKER HEIGHTS, OHIO, ASSIGNOR TO THE ATLAS BOLT & SCREW CO., OF CLEVELAND, OHIO, A CORPORATION OF OHIO

BATTERY BOX

Application filed March 8, 1927. Serial No. 173,686.

My invention relates to battery boxes generally and particularly to the structure of the bottoms thereof.

One of the objects of my invention is to provide battery boxes with drainage means and to construct these means in a simple, inexpensive, economical, convenient, and efficient manner and to arrange these means so that battery boxes are drained automatically during the use thereof and so that they can be cleaned easily and conveniently and economically either while batteries are in the box or while the box is empty. Other objects will appear, or become apparent or obvious, or will suggest themselves, during the description of the devices shown in the accompanying drawing.

The inside of battery boxes, particularly those in which storage batteries are housed or stored, are subject to the accumulation of foreign matter or substance which must be, or should be, removed from the boxes at frequent intervals.

Such foreign matter or substance may consist of liquid such as water or electrolyte, or of gases such as acid fumes, or of solid matter such as dust or corrosion from battery terminals or other parts, or of a combination of any or all of these.

My invention aims to prevent the accumulation of the foreign matter mentioned by permitting the same to automatically drain out of the boxes so that they need not be cleaned as often as previously and to provide an easy and convenient and ecnomical means for cleaning them when they do need cleaning.

In order to illustrate my invention, I have shown the same, in the accompanying drawing, as embodied in four different structures to indicate in a certain degree how my invention may be, or can be, embodied in different structures. It is understood, however, that such showing does not constitute a limitation of my invention since it is presented for illustration purposes and since I am aware that my invention can be embodied in other structures also.

In the accompanying drawing:—

Fig. 1 is a general perspective view, partly in section, of the lower or bottom portion of a battery box embodying the features of my invention and shows a solid floor with the side edges sloping downwardly in curves and stools on the plate and drainage openings in the two side walls of the box adjacent to the curved side edges.

Fig. 2 is a transverse section taken in a plane indicated by the line 2—2 in Fig. 1 and shows structural details of the bottom portion of the box more clearly and a portion of a locomotive is shown in this view to indicate how drainage may clear parts thereof.

Fig. 3 is a sectional view taken in a plane indicated by the line 3 in Fig. 1 and shows the relation of the drainage openings and the floor more clearly and on a larger scale.

Fig. 4 is a general perspective view, partly in section, of the lower or bottom portion of a battery box embodying the features of my invention and shows a floor having a perforated bottom plate fixed in position and a drain plate with sloping surface fixed to the bottom of the box by spacer brackets.

Fig. 5 is a sectional view taken in a plane indicated by the line 5 in Fig. 4 and shows the joints between the plates and the walls of the box and the spacers more clearly and on a larger scale.

Fig. 6 is a sectional view taken in a plane similar to Fig. 5 and shows a structure similar to Fig. 4 with a removable bottom plate.

Fig. 7 is a sectional perspective view of a battery box embodying the features of my invention and shows one bottom plate fixed on and resting on angles fixed on the outside of the battery box walls and drainage holes in the angles.

Similar reference characters refer to similar parts throughout the views which pertain to each other.

In the illustration shown in Figs. 1, 2 and 3 my invention is embodied in a structure which is very simple and inexpensive and which drains battery boxes automatically and which can easily and conveniently and economically and effectively be cleaned by means of a hose or other equivalent means conveying liquid or air or other suitable means into the interior of the battery box either through the top of the box or through the openings in the sides of the box and either while battery trays are in the box or while they are not therein. In this illustration I also provide stools to raise the bottoms of battery trays above the top of the bottom plate to facilitate the ventilation and the cleaning drainage of the box.

Referring now particularly to the details of structure of the particular device shown in Figs. 1, 2 and 3:—

The floor of the box is here shown as a solid and flat bottom plate A which has the side edges 10 and 11 sloping downwardly in curves and extending beyond the sides of the box B and has the end edges 12 and 13 riveted to the bottoms of the angles 14 and 15 which are riveted to the end walls 16 and 17 of the box B.

The clip angles 18 are riveted to the plate A and to the sidewalls 19 and 20 of the box B. The lower end of the sidewalls 19 and 20 has portions thereof cut away between the angles 18 to form the openings 21.

The stools 22 and 23, of suitable material, electrically insulating or otherwise, rest on the plate A in spacings to suit battery trays and are, preferably, held in position to prevent the shifting thereof by the pins 24 which permit the removal of the stools for cleaning or changing or other purposes.

Instead of each row of the individual stools 22 and 23 and 22, one strip, either fixed or removable, can be used for each row when the ventilation and drainage is not so important, but it is preferred that the individual stools are used, to afford as much drainage space as possible in the box to facilitate the drainage attendant to the cleaning or to the ventilation of the box.

With this stool arrangement, one corner of the bottom of four of the trays C rest on each of the stools 23 and one corner of the bottom of two trays rest on each of the stools 22. This tray arrangement is indicated in dotted lines in the drawing.

The stools may be, and can be, omitted and the trays may, or can, rest directly on the plate A when so desired.

During the use of the battery box, all foreign matter which reaches the inside of the box naturally drops or gravitates downwardly upon the plate A except such matter which adheres to the inside of the walls of the box. In many instances, as in electric storage battery locomotives for instance, there is a constant vibration which automatically helps to move the foreign matter which, eventually and automatically finds its way out of the box through the openings 21 and downwardly on the curved surfaces of the edges 10 and 11 which are, or can be, extended to any convenient or desirable termination to clear other structures associated with the box B and thereby discharge substance away from these other parts to prevent the same from interfering with the operation or with the life of these parts as is indicated suggestively in Fig. 2.

When the battery box does need cleaning, a hose, or equivalent means, conveying a cleaning medium, under pressure or otherwise, can easily and conveniently be directed into the box through the top thereof and against the inside of the walls as well as against objects in the box and thereby loosen the substance from the walls and from the objects and directs it downwardly and onto the plate A from where it either rolls off of the plate A automatically or is forced off of the plate A by means of the hose means mentioned directed into the box through the openings 21.

Such a hose or equivalent means can also be directed into the interior of the box through the openings 21 either conjointly with or successively to the directing of such means through the top or independently of such insertion through the top, or while the top of the box is closed, to prevent splashing from reaching an operator or exterior parts or elements. When the cleaning means is applied through the openings 21 on one side of the box, the foreign matter is discharged through the openings 21 on the other side of the box.

It is observed that the ends or spouts 10 and 11 are disposed on the sides of the battery box in the present instance. They could, of course, be disposed in other manners. By disposing them at the sides, a decided advantage is attained in that, in such devices as storage battery locomotives for instance, where the operator usually sits on the end, or where a platform or other structure associated with the box or with the locomotive is located or disposed on the ends, the foreign matter is discharged away from the operator or from associated elements.

The stools or the strips can be removed for individual cleaning but, even when they are fixed in position or while trays rest thereon, effective drainage as well as effective cleaning of the box and the contents can be effected either through the openings 21 or through the top of the box. The stools or the strips raise the trays off of the top of the plate A and thereby keep the bottoms of the trays dry as well as afford a convenient drainage means for cleaning and ventilation.

In the illustration shown in Figs. 4 and 5, my invention is embodied in a structure which is a little more expensive than the device shown in Figs. 1 to 3 but has better automatic drainage facilities.

Referring now particularly to the details of the particular structure of the device shown in Figs. 4 and 5:—

The perforated self draining flat bottom plate D, a part of the floor of the battery box, rests on and is riveted to the four angles 25 which are riveted to the walls of the box B.

The self draining bottom plate or drain plate E, a part of the floor of the battery box, has the two sloping surfaces 26 and 27, is high along the middle, and has the spout like and downwardly sloping draining flanges 28 extending beyond the respective sides of the box B and is suspended below the plate D and in desired relation thereto by means of the brackets 29 which are riveted to the side angles 25 and to the plate E which brackets also act as spacers to strengthen the bottom of the box in the manner of truss structures well known in engineering.

When so desired, the plate D can be omitted and the trays can rest either on the sloping bottom plate E or on stools similar to the stools described in connection with Figs. 1 to 3. In this structure, the bottoms of the stools or of the strips can be beveled so that the upper surface of all or of a number of them are on the same level to support either all or a number of trays on the same level. When the plate D is used, stools or strips similar to those described in connection with Figs. 1 to 3 can be provided and placed on the plate D if so desired for purposes previously described.

In this instance, the automatically or self draining as well as the cleaning and ventilation are attained or accomplished in a manner similar to that described in connection with Figs. 1 to 3.

In this device, the openings 30 are formed by the slope of the plate E which spaces the surfaces 26 and 27 from the lower edges of the side walls of the box and thereby leaves the openings 30.

The sloping surfaces 26 and 27, with the highest point thereof longitudinally and substantially along the middle thereof, facilitates the removal, automatically or otherwise, of foreign matter from the box.

Other advantages are obvious from the advantages pointed out above.

As an additional facility for cleaning a battery box, the bottom plate thereof can be made removable. This is illustrated in Fig. 6 where I have shown a modification of Fig. 5 in that the plate D rests on the heads of the rivets 31. This structure permits the plate D to be removed for cleaning or other purposes. Stools similar to the stools 22 shown in Figs. 1 and 2 can be provided on the plate D if so desired.

As an additional advantage in economy of structure, I have shown, in Fig. 7, another structure wherein the bottom plate 32 as well as the walls 33 of the box B are bounded on the outside by the angles 34 which have the holes 35 through them. The flanges 36 having the sloping surfaces 37 are riveted to the angles 34.

The operation and advantages of the devices shown in Figs. 6 and 7 appear to be obvious from the description given in connection with Figs. 1 to 5.

It is believed that the foregoing discloses my invention sufficiently clear for a full understanding thereof and shows that my invention provides a simple, inexpensive, convenient, economical, and easily operable drainage means for the bottom portions of battery boxes which automatically drain battery boxes either inwardly as for air for instance, or outwardly as for foreign matter for instance, and which permit of easy and convenient and economical and thorough cleaning of the inside of battery boxes either from the top or from the bottom thereof.

I am aware that my invention can be embodied in devices other than the four illustrations shown and described and that changes can be made in the structures and in the arrangements of the elements as shown and described within the scope of the appended claims; therefore, without limiting myself to the precise application of my invention as shown and described nor to the precise structures and arrangements of elements as shown and described.

I claim:—

1. A battery box including a drainable bottom plate to support battery trays, and a drain plate below said bottom plate and sloping downwardly from said bottom plate toward both sides of said box and extending beyond both of said sides.

2. A battery box including a drainable bottom plate to support battery trays, a drain plate below said bottom plate and sloping downwardly from said bottom plate toward both sides of said box and extending beyond both of said sides, and spacers between both of said plates to retain the same in draining relation with each other.

3. A battery box including a drainable and removable bottom plate and drainage means associated with said plate and draining to the outside of the sides of said box and beyond structure which supports said box.

4. A battery box including a drainable bottom plate, drainage means having a surface sloping downwardly toward the sides of said box and terminating outside of the sides of said box and beyond structure which supports said box, and stool means resting on said plate to support battery trays above said plate and removable from said plate.

5. A battery box including a floor means adapted to receive drainage and draining means to receive drainage from said floor means and to convey the same laterally away from the box.

6. A battery box including a floor means adapted to receive drainage and draining means to receive drainage from said floor means and sloping outwardly and downwardly of the box to convey the drainage away from the box.

7. A battery box including a floor means adapted to receive drainage and draining means to receive drainage from said floor means and to convey the same laterally away from the box and stool means on said floor means to retain the bottom of a battery space from said floor means.

8. A battery box including a self draining floor means adapted to receive drainage, draining means to receive drainage from said floor means and sloping outwardly and downwardly of the box to convey the drainage away from the box, and stool means on said floor means to retain the bottom of a battery spaced from said floor means.

9. A battery box including a floor means having a drain plate adapted to receive drainage, a bottom plate to receive drainage from said drain plate, and draining means to receive drainage from said bottom plate and to convey the same laterally away from the box.

10. A battery box including a floor means having a removably supported drain plate adapted to receive drainage, a bottom plate to receive drainage from said drain plate, and draining means to receive drainage from said bottom plate and to convey the same laterally away from the box.

11. A battery box including a floor means having a downwardly sloping drainage surface extending laterally beyond the box.

12. A battery box including a floor means having a drainage surface sloping downwardly toward an end thereof and a surface sloping downwardly from said end.

In testimony of the foregoing I affix my signature.

EUGENE W. SCHELLENTRAGER.